US006819672B1

(12) United States Patent
Corneliussen

(10) Patent No.: US 6,819,672 B1
(45) Date of Patent: Nov. 16, 2004

(54) METHOD FOR CALCULATING DURATION OF CONNECTIONS, ESPECIALLY IN CONNECTION WITH PACKET SWITCHED NETWORKS

(75) Inventor: Knut S. B. Corneliussen, Oslo (NO)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/303,936

(22) Filed: May 3, 1999

(30) Foreign Application Priority Data

May 4, 1998 (NO) ................................................. 982014

(51) Int. Cl.[7] ............................ H04L 3/14; H04L 12/56
(52) U.S. Cl. ................ 370/395.1; 370/252; 379/114.01
(58) Field of Search ................................. 370/252, 253, 370/230, 230.1, 232, 233, 234, 395.1, 465; 379/114.01, 114.06, 114.08, 124, 133

(56) References Cited

U.S. PATENT DOCUMENTS

| | | | | |
|---|---|---|---|---|
| 4,933,931 A | * | 6/1990 | Kokubo ....................... 370/259 |
| 5,065,393 A | * | 11/1991 | Sibbitt et al. ................ 340/2.6 |
| 5,406,555 A | * | 4/1995 | Yoshida ....................... 370/252 |
| 5,953,334 A | * | 9/1999 | Morita et al. ............ 370/230.1 |
| 5,982,754 A | * | 11/1999 | Itou et al. .................... 370/252 |
| 6,047,326 A | * | 4/2000 | Kilkki ......................... 709/228 |
| 6,104,704 A | * | 8/2000 | Buhler et al. ............... 370/252 |
| 6,327,247 B1 | * | 12/2001 | Naudts ........................ 370/232 |

FOREIGN PATENT DOCUMENTS

| | | |
|---|---|---|
| EP | 0866596 | 9/1998 |
| JP | 02 166942 A | 6/1990 |
| JP | 03 196733 A | 8/1991 |
| JP | 03 198547 A | 8/1991 |
| JP | 04 100435 A | 4/1992 |
| JP | 04 369941 A | 12/1992 |
| JP | 05 048602 A | 2/1993 |
| JP | 05 167578 A | 7/1993 |
| JP | 05 199223 A | 8/1993 |
| JP | 05 292082 A | 11/1993 |
| JP | 05 327703 A | 12/1993 |
| WO | WO 97/177783 | * 5/1997 ........... H04L/12/56 |

OTHER PUBLICATIONS

Courcoubetis et al. "Comparing usage–based pricing schemes for broadband networks" in Charging for ATM—The Reality Arrives (Ref. No: 1997/328, IEE Colloquium on Nov. 20, 1997.

* cited by examiner

Primary Examiner—Chau Nguyen
Assistant Examiner—Soon Dong Hyun
(74) Attorney, Agent, or Firm—Nixon & Vanderhye P.C.

(57) ABSTRACT

A method for calculating duration of a connection, especially in connection with a packet switched network, to determine a charge for the connection based on time and volume of the connection. A time counter is used to implement the method in connection-oriented networks and in connection-less networks independently of related protocols. In an example embodiment, a first timer counter measures the time between successive arriving packets, and a second timer counter is updated by the value of the first timer counter when a new packet arrives.

13 Claims, 4 Drawing Sheets

METHOD FOR CALCULATING DURATION OF CONNECTIONS, ESPECIALLY IN CONNECTION WITH PACKET SWITCHED NETWORKS

FIELD OF THE INVENTION

The present invention relates to a method for calculating duration of connections, especially in connection with packet switched network, to determine a charge for such connections based on time and volume. Although the present invention is described in connection with measuring duration of connections for charging purposes according to volume and time in packet switched networks, the present invention finds other applications where duration of connections is measured.

BACKGROUND OF THE INVENTION

When a charge for a connection in a packet switched network is based on time and volume, it is necessary to calculate the total volume of transmitted-data and the duration of the connection. The formula for charge based on volume and time may be written as follows:

$$Charge = \alpha*Volume + \beta*Time + \gamma$$

wherein $\alpha$ and $\beta$ are weight factors for respectively volume and time, and wherein $\gamma$ is the fixed cost for establishing a connection.

The equipment for measuring the time and volume will be located between the source and the destination of the connection in question, the location being in a router, switch or a stand-alone unit. The metering equipment should not effect the data sent on this connection, and it should only do measurements. The process of effecting measurements will involve some delay in the traffic. This delay should be as small as possible, possibly not effecting the total performance to any significant degree. In order to calculate the total charge, a charging manager may retrieve data from the measuring or metering equipment. Such a charging manager is shown connected to metering equipment for example in FIG. 1.

FIG. 1 shows the metering equipment placed between the source and the destination. The calculated volume and time are collected by the charging manager, and the total charge is calculated. The fixed cost $\gamma$ for establishing a connection is added to the charge at the beginning of the connection.

Depending on the type of network, different methods may be used to obtain the total volume. If the size of each packet is fixed, e.g., in an ATM network, only the number of packets needs to be counted. This counter can then be multiplied by the fixed packet length to obtain the total volume. If the size of packets is variable, e.g., in an IP network, it will be necessary to compute the total length of each packet on the connection in order to obtain the total volume.

One way of calculating connection duration if the network uses a connection-oriented protocol is by recognizing the setup and disconnect messages. The time counter would be started when the setup message is sent, and stopped when a disconnect message is sent. Recognizing the setup and disconnect messages is not possible in a connection-less network because no such messages exist. So a second way of calculating connection duration in a connection-less network is to start the timer when the metering equipment notices the first packet on the connection. A policy has to be used for stopping the timer, i.e., the timer is stopped after a fixed amount of time.

There are two problems with the first approach outlined above. First, to recognize the setup and disconnect messages, some part of the protocol must be implemented in the metering equipment. This introduces more delay in the metering equipment. Alternatively, the metering equipment itself has to take an active role in the establishment of the connection. The metering equipment can remove the setup message from the network, and on behalf of the originator, send a new setup message.

A second problem is that the counter is only stopped when the disconnect message is received. This problem with measuring the duration of connections in connection-oriented networks by relying on the setup and disconnect messages occurring if the disconnect packet is lost or corrupted is illustrated in FIG. 2. If one of the stations terminates for some reason, it is not certain that a disconnect signal will ever be sent. To avoid having the time counter count on indefinitely, a policy for determining when a connection is considered broken has to be implemented.

The problem with the second approved is that if one reads the timer after the last packet, but before time-out, this gives an incorrect value for the length of the call, a condition illustrated schematically in FIG. 3. More specifically, FIG. 3 illustrates the problem in connection-less networks of determining the last packet. If the duration timer is read before the predefined time-out, an incorrect value for the actual duration will be provided.

OBJECTS OF THE INVENTION

An object of the present invention is to provide a method for easier and more accurate calculation of the duration of connections.

Another object of the present invention is to implement a time counter for a connection in metering equipment.

A further object of the present invention is to provide a method solving problems with measuring duration of connections in both connection-oriented and connection-less networks.

A further object of the present invention is to provide a method for calculating duration of connections independent of the protocol used for the measured connections.

Another object of the present invention is to provide a method for calculating duration of connections wherein no decision on time-outs has to be made.

SUMMARY OF THE INVENTION

The above and other objects are achieved in the present timer counter invention using a first timer counter measuring the time between successive arriving packets and a second timer updated by the value of the first timer counter when a new packet arrives. The timer counter presents the time between the first and last arrived packet and is updated only if a new packet arrives. Consequently, the timer counter provides the exact value for the duration of the connection after the connection is finished as well as before and during the time the connection is active. Because the timer counter does not rely on understanding the protocol used for the connection, it can work for both connection-oriented as well as for connection-less networks.

Further features and advantages of the present invention will appear from the following description taken in connection with the appending drawings, as well as from the attached patent claims.

DETAILED DESCRIPTION

This invention is a solution for implementing a timer counter for a connection in metering equipment. It solves the problem of measuring duration of connections in both connection-oriented and connection-less networks. This timer counter provides the time between the first and last arrived packet, and is updated only if a new packet arrives. This method for implementing the timer counter provides the exact value for the duration of the connection after the connection is finished, as well as before and during the time the connection is active. Because it does not rely on understanding the protocol used for the connection, it works for both connection-oriented and connection-less networks. One method for implementing the invention is as follows:

A timer counter ($\Delta t$) measures the time between successive arriving packets.

Another timer ($T_{tot}$) is updated with the value of $\Delta t$ when a new packet arrives.

The value of the second timer ($T_{tot}$) is provided when the metering equipment gets a request for the current duration of the connection.

Figure 4:
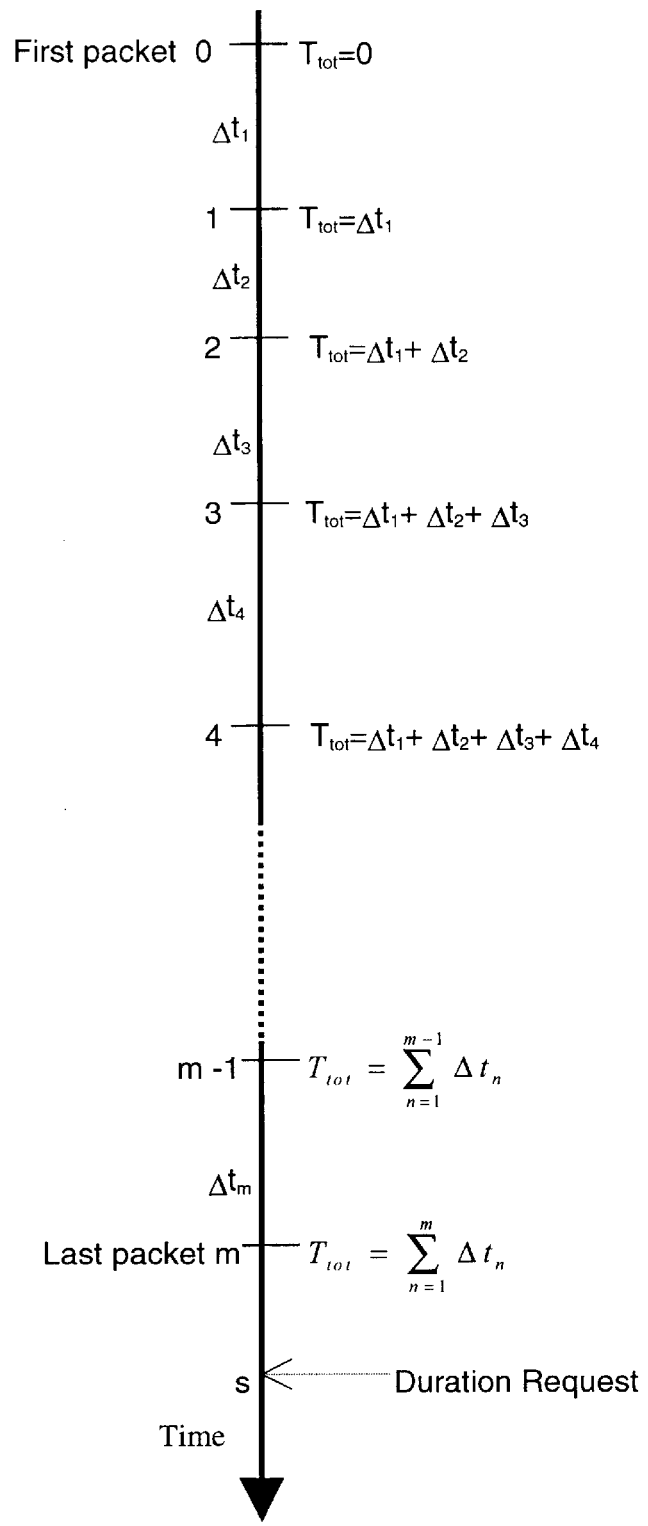
FIG. 4 is a schematic time diagram, or a time line illustrating the time between each arriving packet, and further illustrates the operation of a timer according to the present invention.

FIG. 4 illustrates a time line where $\Delta t$ is the time between each arriving packet, and $T_{tot}$ is a timer according to the present invention. FIG. 4 uses the following symbols:

$\Delta t_n$ – The time between each arriving packet.

$T_{tot} = \sum_{n=1}^{m} \Delta t_n$ – The total timer is the sum of all the $\Delta t_n$ from n = 1 to $m$, where $m$ is the number of arrived packets starting with the first packet as 0. Time $s$ point of time a metering request arrives.

Figure 1:
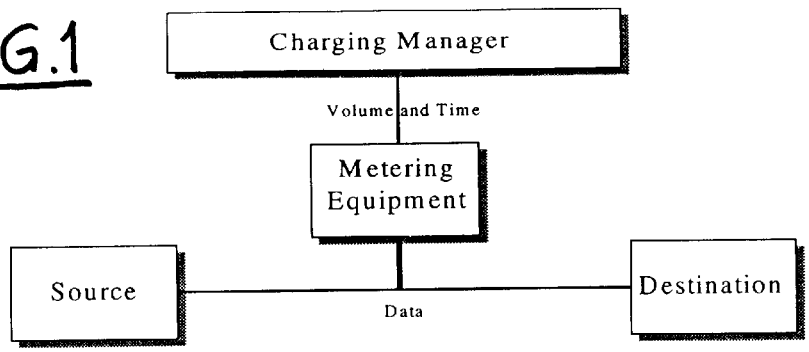
FIG. 1 is a block diagram illustrating metering equipment placed between a source and destination, the calculated volume and time being collected by a charging manager wherein the total charge is calculated.
Figure 2:
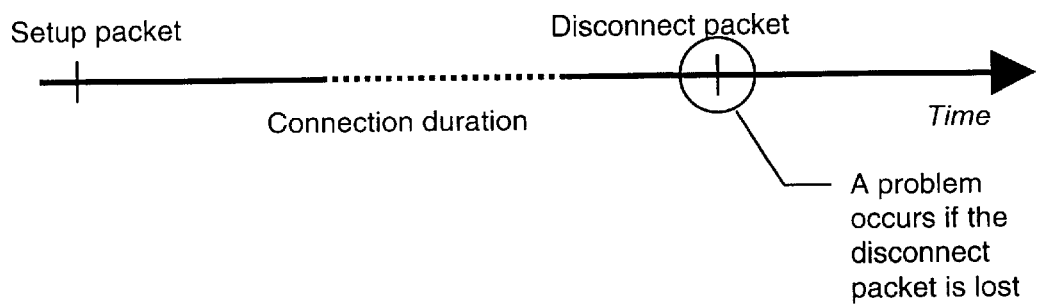
FIG. 2 is a time diagram illustrating the problem with measuring the duration of connections in connection oriented networks relaying on setup and disconnect messages.
Figure 3:
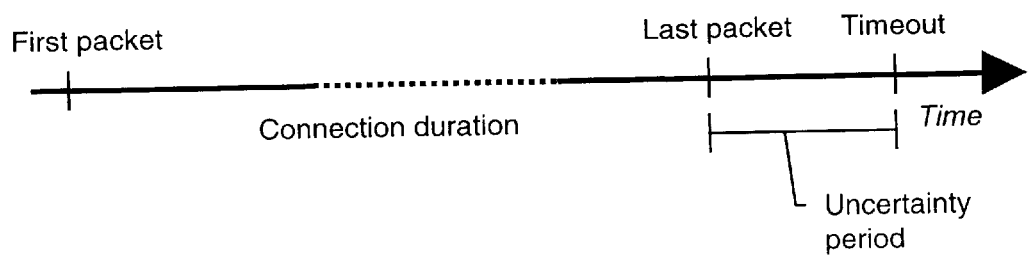
FIG. 3 is a time schedule illustrating the problem with measuring the duration of connections in connection less networks, especially if the duration timer is read before the predefined time-out.

If the approach for determining the duration of connection as described with reference to FIG. 2 is used, the method according to the present invention presents a value equal to the time between the first packet (0), as illustrated in FIG. 4, and the time s when the duration request arrives. The last packet m will arrive at a point of time t, whereby t<s.

Consequently, if this interval method is used, it will provide the time from the first packet 0 and to the last packet m arriving at time t.

Another way of using the present method is to start $T_{tot}$ when the first packet arrives, whereby $\Delta t$ will operate as illustrated in the other Figures measuring the time between successively arriving packets. When answering a request for duration, the value $T_{tot}$–the current value of $\Delta t$ will be given. This approach of implementing the time measurement gives the same accuracy as the approach just described but requires two running timers per connection.

Figure 5:
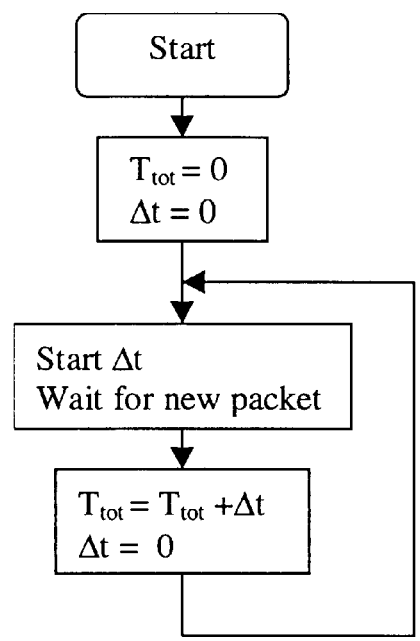
FIG. 5 is a state diagram illustrating the method for measuring time for connections in accordance with an embodiment of the present method.

FIG. 5 illustrates in a state diagram the method according to the present invention for measuring time for connections.

Figure 6:
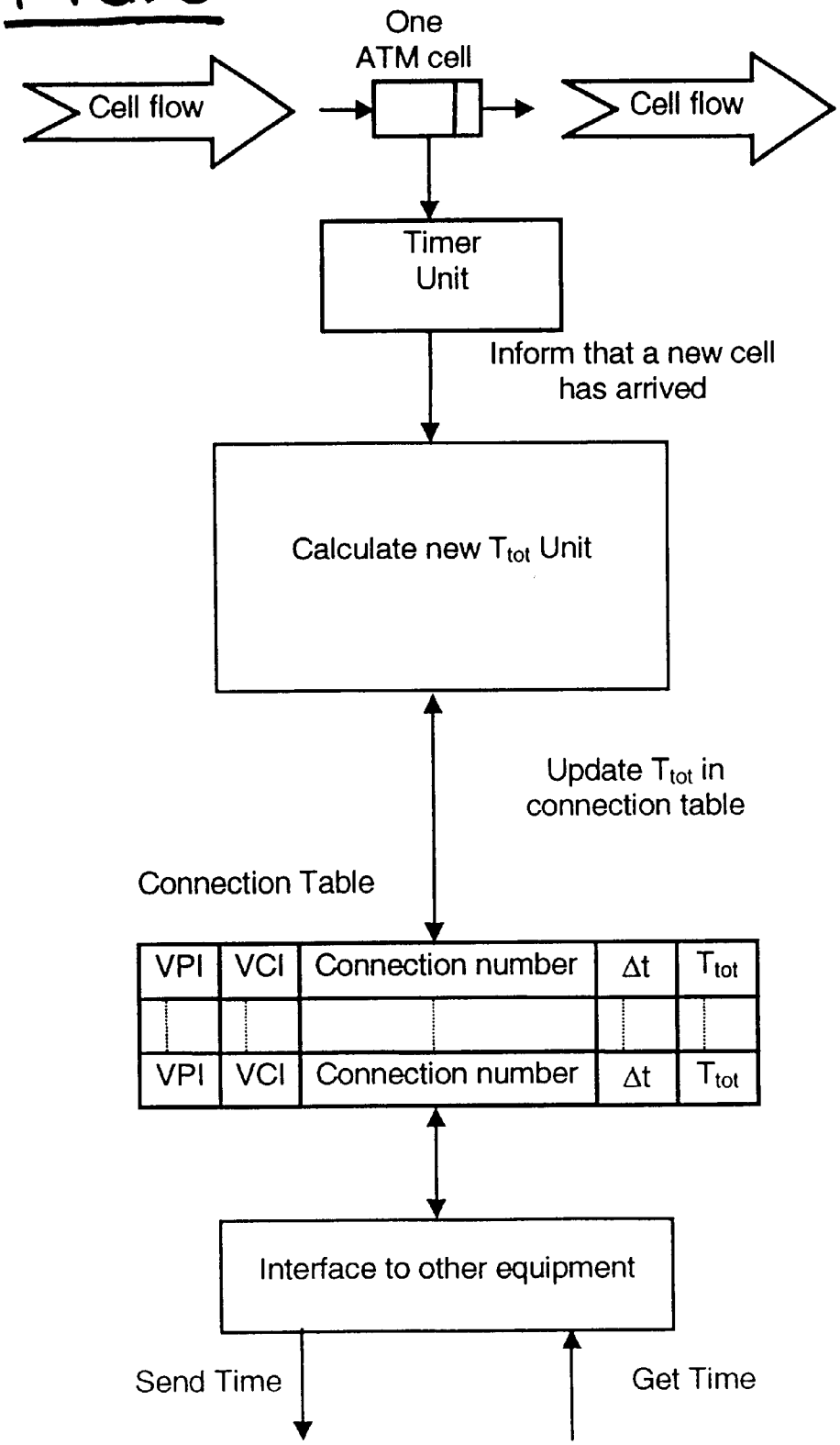
FIG. 6 is a schematical representation of how the invention can be realized, and wherein the state diagram according to FIG. 5 can be implemented.

In FIG. 6 illustrates one way to realize the invention. The state diagram according to FIG. 5 can be located in the block designated "calculate new $T_{tot}$ unit" and the connection table illustrated therein.

Figure 7:
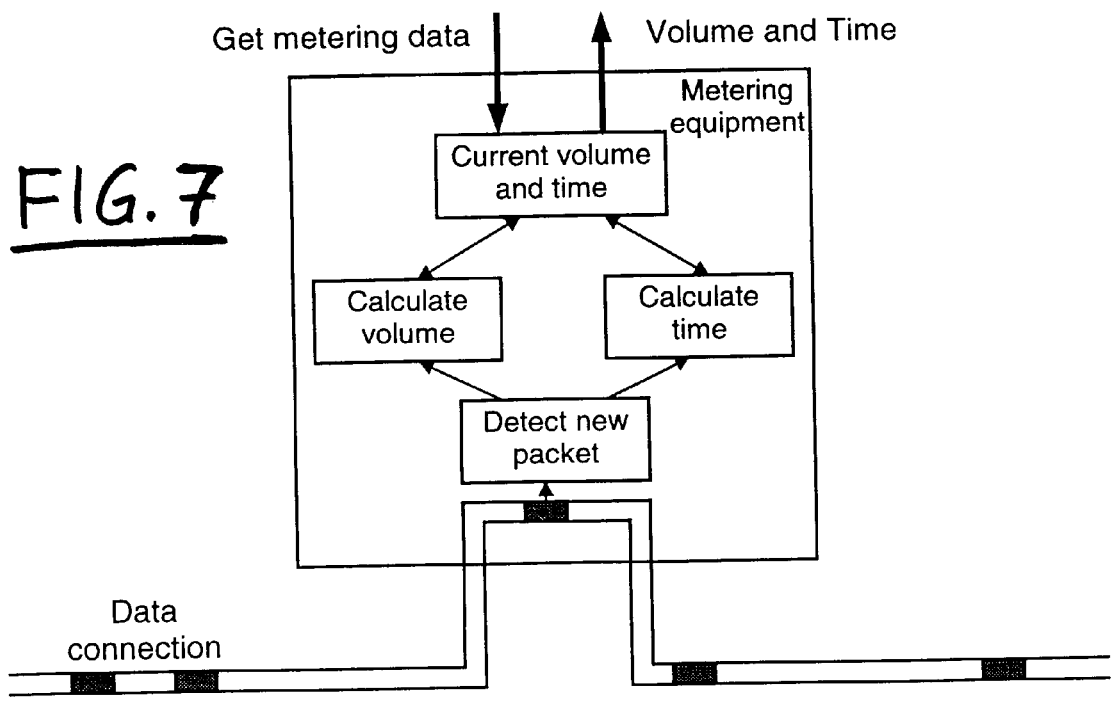
FIG. 7 is a block diagram illustrating the metering equipment and the data connection operating in accordance with the present method, the schematical representation according to FIG. 6 being implemented therein.

FIG. 7 is a block diagram illustrating the metering equipment and the data connection in an embodiment according to the present invention. Here, the elements according to FIG. 6 could be located inside the block designated "calculate time" together with the block designated "detect new packet".

With this invention, the total time for a given connection is the time from the first to the last packet. At any point in time when the equipment is asked for the duration of the connection, the duration provides the time from the first to last packet. This works for both for connection-oriented and connection-less protocols. Other advantages involve that some form of understanding of the protocol used for the measured connections is not needed, and no decision on time-outs has to be made.

This method for implementing a duration timer can be used for not only for charging, but for any other situation where duration for connections is measured.

What is claimed is:

1. A method for calculating a duration of a connection to determine a charge based on a time and a volume of the connection, comprising:

using a first timer counter to measure a time between successive arriving packets detected on the connection;

updating a second timer counter by a value of the first timer counter when a new packet is sent on the connection; and in response to a metering request arriving during the connection, providing a value equal to a time from a first packet detected on the connection to a last packet detected on the connection using the second timer counter value.

2. A method for calculating a duration of a connection to determine a charge based on a time and a volume of the connection, comprising:

using a first timer counter to measure a time between successive arriving packets detected on the connection, and updating a second timer counter by a value of the first timer counter when a new packet is sent on the connection, wherein the first timer counter and the second timer counter are implemented in metering equipment, the metering equipment providing a value of the second timer counter during the connection when receiving a request for a current duration of the connection.

3. The method in claim 2, further comprising:

in response to a metering request arriving at a request time s, providing a value $T_{tot}$ equal to the time between a first packet being detected on the connection and the request time s in according with the following:

$$T_{tot} = \sum_{n=1}^{m} \Delta t_n$$

where m is a last packet detected on the connection at time t, t<s.

4. The method in claim 1, further comprising:

starting the second timer counter when a first packet is detected on the connection, and measuring a time between successive arriving packets.

5. The method in claim 1, wherein a duration of time from when the first packet is detected on the connection to when the last packet is detected on the connection based on the second timer counter value is provided independently of a connection-oriented protocol or a connection-less protocol.

6. The method in claim 1, wherein the calculation of duration of the connection indicates a time until a last received packet without requiring a time-out operation.

7. The method in claim 1, wherein the first timer and the second timer communicate with one or more connection tables, the one or more connection tables cooperate with other equipment through an appropriate interface.

8. Apparatus for use in calculating a duration of a connection to determine a charge based on a time and a volume of the connection, comprising:

a first timer counter for measuring a time between successive arriving packets detected on the connection;

a second timer counter for updating a second timer counter value by a value of the first timer counter when a new packet is sent on the connection; and circuitry configured to determine the connection duration using the value of the second timer counter, wherein the first timer counter and the second timer counter are implemented in metering equipment, the metering equipment configured to provide a value of the second timer counter during the connection when receiving a request for a current duration of the connection.

9. The apparatus in claim 8, wherein in response to a metering request arriving at a request time s, the circuitry is configured to provide a value $T_{tot}$ equal to the time between a first packet being detected on the connection and the request time s in according with the following:

$$T_{tot} = \sum_{n=1}^{m} \Delta t_n$$

where m is a last packet detected on the connection at time t, t<s.

10. The apparatus in claim 8, wherein in response to a metering request arriving at a request time, the circuitry is configured to provide a value equal to a time from a first packet detected on the connection to a last packet detected on the connection using the second timer counter value.

11. Apparatus for use in calculating a duration of a connection to determine a charge based on a time and a volume of the connection, comprising:

a first timer counter for measuring a time between successive arriving packets detected on the connection;

a second timer counter for updating a second timer counter value by a value of the first timer counter when a new packet is sent on the connection;

circuitry configured to determine the connection duration using the value of the second timer counter;

wherein the circuitry is further configured to:

start the second timer counter when a first packet is detected on the connection;

measure a time between successive arriving packets; and provide a current value of the second timer counter in response to a request for a duration of the connection received during the connection.

12. The apparatus in claim 8, wherein the circuitry is configured to provide a duration of time from when the first packet is detected on the connection to when the last packet is detected on the connection based on the second timer counter value independently of a connection-oriented protocol or a connection-less protocol.

13. The apparatus in claim 8, wherein the first timer and the second timer are adapted to communicate with one or more connection tables, the one or more connection tables being adapted to cooperate with other equipment through an appropriate interface.

* * * * *